US010616464B2

(12) United States Patent
Shultz

(10) Patent No.: US 10,616,464 B2
(45) Date of Patent: *Apr. 7, 2020

(54) APPARATUS AND METHOD FOR AUTOMATICALLY ACTIVATING A CAMERA APPLICATION BASED ON DETECTING AN INTENT TO CAPTURE A PHOTOGRAPH OR A VIDEO

(71) Applicant: Apple Inc., Cupertino, CA (US)

(72) Inventor: Conrad A. Shultz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,835

(22) Filed: Jul. 20, 2018

(65) Prior Publication Data

US 2019/0020801 A1    Jan. 17, 2019

Related U.S. Application Data

(63) Continuation of application No. 15/429,521, filed on Feb. 10, 2017, now Pat. No. 10,051,168, which is a
(Continued)

(51) Int. Cl.
*H04N 5/232* (2006.01)
*G06F 1/16* (2006.01)
(Continued)

(52) U.S. Cl.
CPC ........... *H04N 5/232* (2013.01); *G06F 1/1613* (2013.01); *G06F 1/1622* (2013.01);
(Continued)

(58) Field of Classification Search
CPC . H04N 5/232; H04N 5/2257; H04M 1/72577; H04M 1/72522; H04M 1/67;
(Continued)

(56) References Cited

U.S. PATENT DOCUMENTS 7,173,534 B1    2/2007    Markham et al.
7,791,594 B2    9/2010    Dunko
(Continued)

FOREIGN PATENT DOCUMENTS

JP    2007249797    9/2010

OTHER PUBLICATIONS

U.S. Appl. No. 13/610,756, filed Sep. 11, 2012, entitled "Preemptive Hardware Activation".
(Continued)

*Primary Examiner* — Lin Ye
*Assistant Examiner* — John H Morehead, III
(74) *Attorney, Agent, or Firm* — Womble Bond Dickinson (US) LLP

(57) ABSTRACT

A method of automatically activating a camera application implemented in a mobile device in locked mode starts with the processor receiving a first signal from an accelerometer. The device's processor activates the camera application when the processor determines that the mobile device has remained in a stationary portrait or landscape position for a period of time based on the first signal. Activating the camera application includes signaling by the processor to the display device to display a camera screen from a locked screen. The processor may also receive a second signal from a proximity sensor that detects presence of a nearby object to the mobile device. When the processor determines that there is presence of the nearby object to the mobile device based on the second signal, the mobile device remains in locked mode and the processor does not activate the camera application.

24 Claims, 5 Drawing Sheets

Related U.S. Application Data continuation of application No. 15/075,847, filed on Mar. 21, 2016, now Pat. No. 9,571,714, which is a continuation of application No. 13/769,174, filed on Feb. 15, 2013, now Pat. No. 9,292,045.

(51) Int. Cl.
  *H04N 5/225* (2006.01)
  *H04M 1/725* (2006.01)
  *H04W 12/06* (2009.01)
  *H04M 1/67* (2006.01)

(52) U.S. Cl.
  CPC ...... *G06F 1/1686* (2013.01); *H04M 1/72522* (2013.01); *H04M 1/72577* (2013.01); *H04N 5/2257* (2013.01); *H04W 12/06* (2013.01); *H04M 1/67* (2013.01); *H04M 2250/12* (2013.01); *H04M 2250/52* (2013.01)

(58) Field of Classification Search
  CPC .......... H04M 2250/52; H04M 2250/12; G06F 1/1613; G06F 1/1622; G06F 1/1686; H04W 12/06
  See application file for complete search history.

(56) References Cited

U.S. PATENT DOCUMENTS

| | | | |
|---|---|---|---|
| 8,149,089 B2 | 4/2012 | Lin et al. | |
| 8,235,529 B1* | 8/2012 | Raffle | A61B 3/113 |
| | | | 351/209 |
| 8,988,402 B2 | 3/2015 | Tsuchi | |
| 8,994,499 B2 | 3/2015 | Zhao et al. | |
| 9,292,045 B2 | 3/2016 | Shultz | |
| 9,571,714 B2 | 2/2017 | Shultz | |
| 9,953,152 B2 | 4/2018 | Fadell et al. | |
| 10,051,168 B2* | 8/2018 | Shultz | G06F 1/1613 |
| 2003/0020688 A1 | 1/2003 | Norskog et al. | |
| 2006/0056664 A1 | 3/2006 | Iwasaki | |
| 2006/0239336 A1 | 10/2006 | Baraniuk et al. | |
| 2006/0242434 A1 | 10/2006 | Lee | |
| 2006/0284969 A1 | 12/2006 | Kim et al. | |
| 2007/0259685 A1 | 11/2007 | Engblom et al. | |
| 2008/0189783 A1 | 8/2008 | Music et al. | |
| 2009/0026979 A1 | 1/2009 | Reid | |
| 2009/0070798 A1 | 3/2009 | Lee et al. | |
| 2009/0160609 A1 | 6/2009 | Lin | |
| 2009/0184801 A1 | 7/2009 | Bliding et al. | |
| 2009/0258667 A1 | 10/2009 | Suzuki et al. | |
| 2009/0320123 A1 | 12/2009 | Yu et al. | |
| 2010/0031072 A1 | 2/2010 | Hung et al. | |
| 2010/0033464 A1 | 2/2010 | Shimatani | |
| 2011/0007058 A1 | 1/2011 | Hisano | |
| 2011/0151934 A1 | 6/2011 | Geng | |
| 2011/0179386 A1 | 7/2011 | Shaffer et al. | |
| 2011/0199366 A1 | 8/2011 | Tsuchi | |
| 2011/0199470 A1 | 8/2011 | Moller et al. | |
| 2011/0216209 A1 | 9/2011 | Fredlund et al. | |
| 2011/0312349 A1 | 12/2011 | Forutanpour | |
| 2012/0009896 A1 | 1/2012 | Bandyopadhyay et al. | |
| 2012/0060123 A1 | 3/2012 | Smith | |
| 2012/0069231 A1 | 3/2012 | Chao | |
| 2012/0093374 A1 | 4/2012 | Fan et al. | |
| 2013/0050250 A1* | 2/2013 | Brinda | H04M 1/72544 |
| | | | 345/619 |
| 2013/0057713 A1 | 3/2013 | Khawand | |
| 2013/0063611 A1* | 3/2013 | Papakipos | G06F 1/1686 |
| | | | 348/207.11 |
| 2013/0137483 A1 | 5/2013 | Senoo | |
| 2013/0283199 A1* | 10/2013 | Selig | G06F 3/0484 |
| | | | 715/781 |
| 2014/0118256 A1 | 5/2014 | Sonoda et al. | |

OTHER PUBLICATIONS

"Lock-Unlock Your Phone Automatically Now—Without Pressing Any Button", printed from Internet on Nov. 2, 2010, http://techinfo.co.in/wordpress/lock-unlock-your-phone-automatically-now-without-pressing-any-button; (Jul. 20, 2010, pp. 1-5.

"Unlock Your Computer with a Smile", BananaScreen Review—BananaScreen Download—Softpedia; printed from Internet on Nov. 2, 2010; http://www.softpedia.com/reviews/windows/BananaScreen-Review-60703.shtml, (Jul. 23, 2007), pp. 1-3.

* cited by examiner

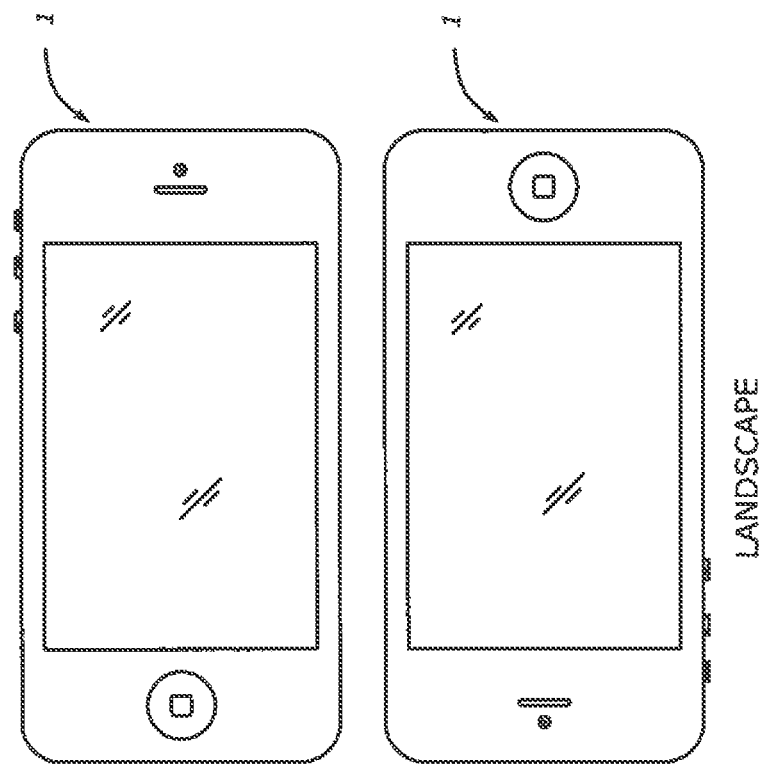
FIG. 3B LANDSCAPE
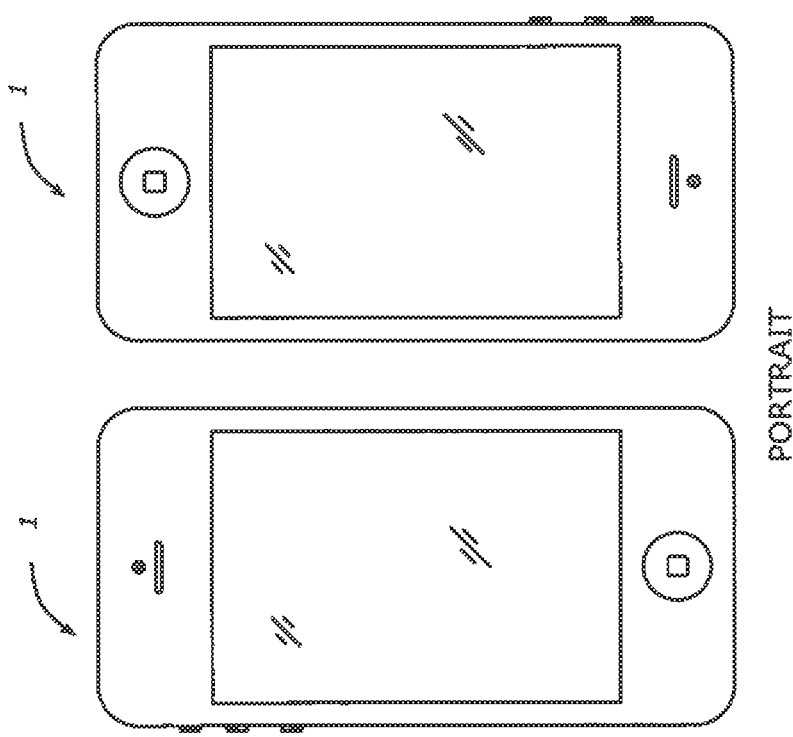
FIG. 3A PORTRAIT

APPARATUS AND METHOD FOR AUTOMATICALLY ACTIVATING A CAMERA APPLICATION BASED ON DETECTING AN INTENT TO CAPTURE A PHOTOGRAPH OR A VIDEO

This application is a continuation of co-pending U.S. application Ser. No. 15/429,521 filed Feb. 10, 2017, which is a continuation of U.S. application Ser. No. 15/075,847 filed Mar. 21, 2016, now issued as U.S. Pat. No. 9,571,714, which is a continuation of U.S. application Ser. No. 13/769,174 filed on Feb. 15, 2013, now issued as U.S. Pat. No. 9,292,045.

FIELD

Embodiments of the invention relate generally to automatically activating a camera application implemented in a mobile device in a locked mode based on detecting that the user of the mobile device intends to capture a photograph. The user's intent to capture a photograph is detected using signals from sensors included in the mobile device.

BACKGROUND

Currently, a wide range of portable consumer electronics that are not dedicated to photographic uses are equipped with cameras. These portable consumer electronics devices (or "mobile devices") may include, for example, smart phones, laptops, notebooks, tablet computers, and personal digital media players.

Since these mobile devices often include a user's sensitive personal information (e.g., emails, contact information) or installed applications that provide quick access to the user's private data (e.g., bank accounts applications), a user often locks these devices using a password or his biometrics. While this locking capability protects the user from identity theft, having to take the time to enter a password or biometrics to unlock the device may not be desirable when the user requires quick access to an application. For instance, if the mobile device is locked when the user wishes to capture a fleeting moment on camera, the user may miss the opportunity to do so since he has to take the time to enter his password or biometrics to unlock the device as well as locate and activate the camera application.

SUMMARY

In one embodiment of the invention, a mobile device comprises an external housing in which electronic components of the device are stored. The electronic components may include, for example, a processor, a data storage containing an operating system and application software for execution by the processor, a display screen, a camera module, and sensors such as an accelerometer to detect at least one of movement, position and orientation of the mobile device and a proximity sensor to detect presence of an object nearby to the mobile device. When the mobile device is in a locked mode, the display screen displays a locked screen. When the processor determines that the mobile device has remained in a stationary portrait position or a stationary landscape position for a period of time based on the first signal that is received from the accelerometer, the processor activates a camera application which includes signaling to the display panel to display a camera screen from the locked screen. The camera application allows a user of the mobile device to capture photographs and videos with the camera module that includes a camera lens that faces a housing camera lens cover. The camera application also allows the user to preview the photographs and videos being captured by using the camera screen. In one embodiment, when the processor determines that there is presence of the nearby object based on a second signal that is received from the proximity sensor, the mobile device remains in locked mode and the processor does not activate the camera application.

Another embodiment of the invention is a method of automatically activating a camera application implemented in a mobile device that includes a processor, an accelerometer, and a display device. The method starts with the processor receiving a first signal from the accelerometer that detects at least one of movement, position and orientation of the mobile device. The processor activates the camera application when the processor determines that the mobile device has remained in a stationary portrait position or a stationary landscape position for a period of time based on the first signal. In this embodiment, activating the camera application includes signaling by the processor to the display device to display a camera screen from a locked screen. In one embodiment, the processor receives a second signal from a proximity sensor included in the mobile device that detects presence of a nearby object to the mobile device. In this embodiment, the mobile device remains in locked mode and the processor does not activate the camera application when the processor determines that there is presence of the nearby object to the mobile device based on the second signal.

Another embodiment of the invention is a computer-readable medium of a storage device having stored thereon instructions, which when executed by a processor, causes the processor to perform a method of automatically activating a camera application. The method starts by receiving a first signal from an accelerometer included in a mobile device that detects movement, position and orientation of the mobile device. The camera application that is implemented in the mobile device is then activated when the processor determines that the mobile device has remained in a stationary portrait position or a stationary landscape position for a period of time based on the first signal. In one embodiment, the processor does not activate the camera application when the processor determines that there is presence of the nearby object to the mobile device based on the second signal received from a proximity sensor included in the mobile device.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings:

FIGS. 3A-3B shows a portable consumer electronic device in which an embodiment of the invention may be implemented in a portrait orientation (FIG. 3A) and in a landscape orientation (FIG. 3B).

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

I. Overview of the Mobile Devices

Figure 1:
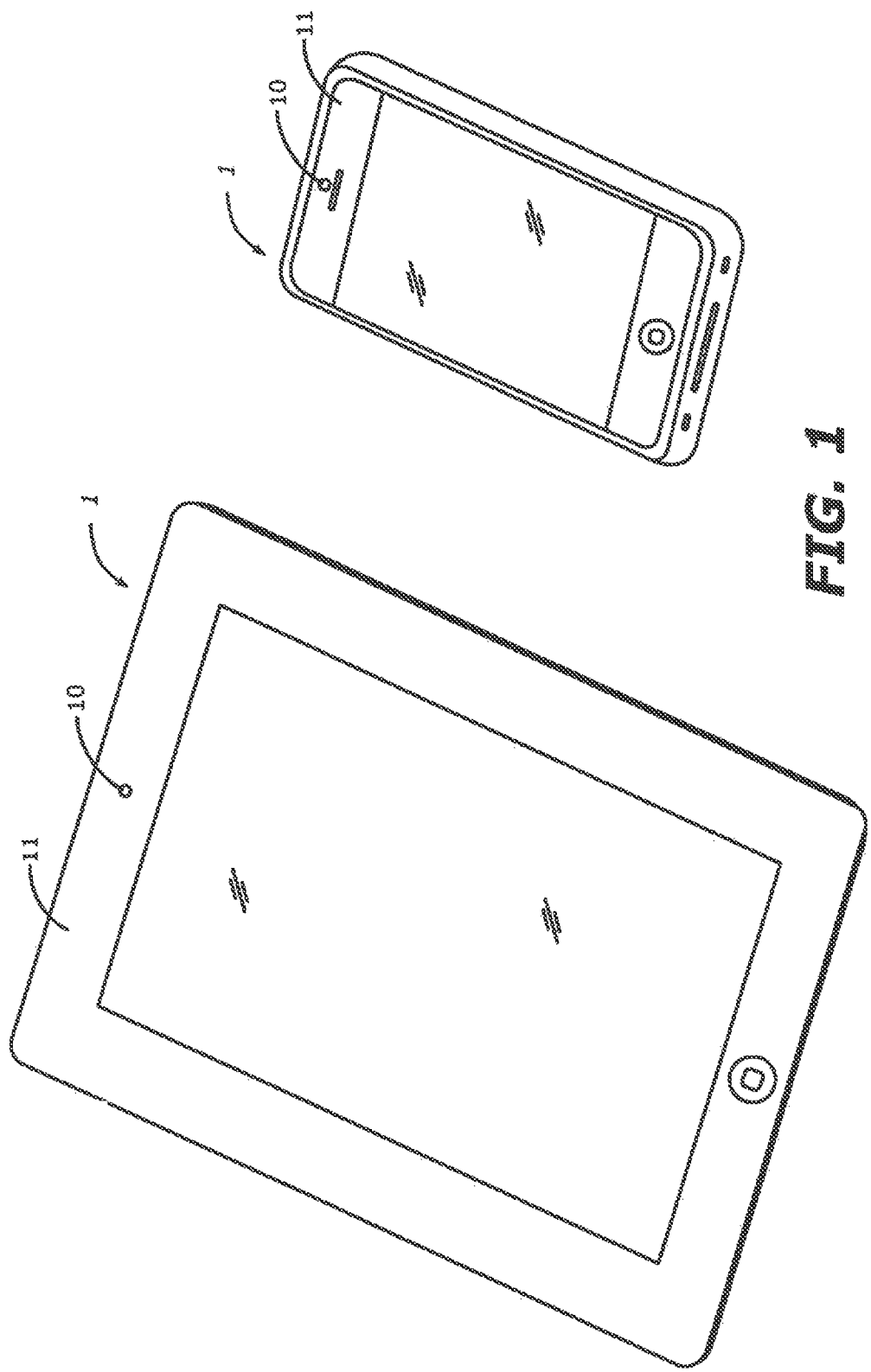
FIG. 1 illustrates examples of portable consumer electronic devices in which an embodiment of the invention may be implemented.

FIG. 1 illustrates examples of a portable consumer electronic device (or "mobile device") that is used in a network system according to one embodiment of the invention. As shown in FIG. 1, the mobile device 1 may be a mobile telephone communications device or a smartphone such as an iPhone™ device, from Apple Inc. of Cupertino, Calif., or a tablet computer such as an iPad™ device, from Apple Inc. of Cupertino, Calif. The mobile device 1 may also be a personal digital media player such an iPod™ device or a notebook computer such as a MacBook Air device, which are all from Apple Inc. of Cupertino, Calif.

As illustrated in FIG. 1, mobile device 1 may include an external housing 11 having a bezel. The bezel may be used to hold a display screen on the front face of the device 1. The display screen may also include a touch screen. Device 1 may also include one or more physical buttons and/or virtual buttons (on the touch screen). Device 1 may also include input-output components such as ports and jacks. For example, device 1 may include a microphone port, speaker ports, a headset jack and a wireless headset interface, to connect with a headset device. The front face of the device 1 may also include a housing camera lens cover 10. The housing 11 may enclose a camera module that includes a camera lens and an image sensor to capture images. The camera module is located to face the housing camera lens cover 10. With this configuration, the camera lens is protected from being damaged by the housing camera lens cover and the camera module is also able to capture images as seen through the housing camera lens cover 10. In some embodiments, the housing camera lens cover 10 on the front side is the same as a glass cover that protects the display screen.

Figure 2:
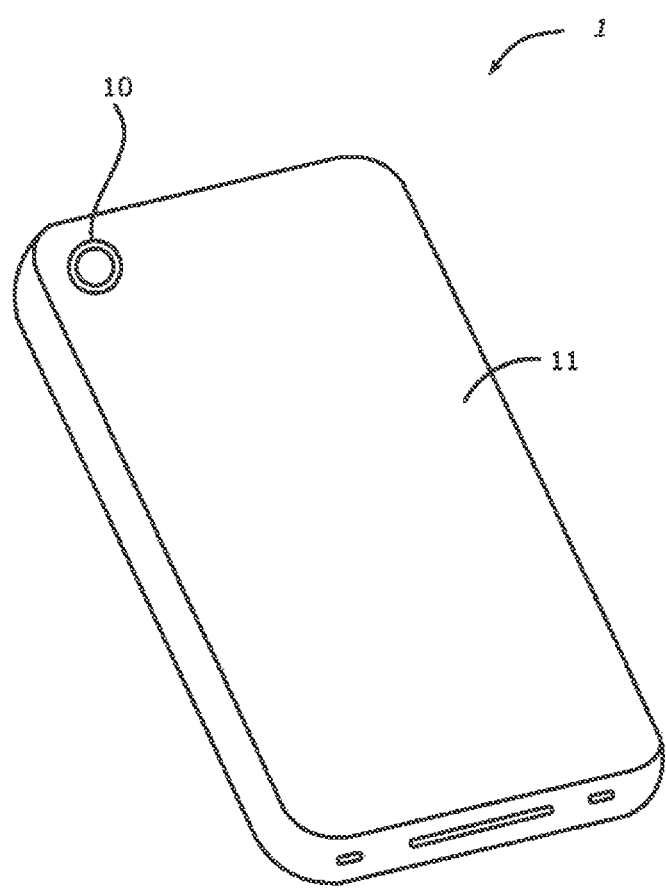
FIG. 2 shows a backside view of a portable consumer electronic device in which an embodiment of the invention may be implemented.

FIG. 2 shows a backside view of the portable consumer electronic device in which an embodiment of the invention may be implemented. In FIG. 2, the backside view of the mobile device 1 shows the external housing including another housing camera lens cover 10. In this embodiment, another camera module is enclosed in the external housing 11 of the mobile device 1 and faces the housing camera lens cover 10 located in the backside of the housing 11.

FIG. 3A-3B shows a portable consumer electronic device in which an embodiment of the invention may be implemented in a portrait orientation (FIG. 3A) and in a landscape orientation (FIG. 3B). When using the mobile device 1 as a camera, the user may hold the mobile device 1 in either orientation, and the display screen will display the camera preview screen accordingly in the selected orientation to allow the user to capture photographs or video.

Figure 4:
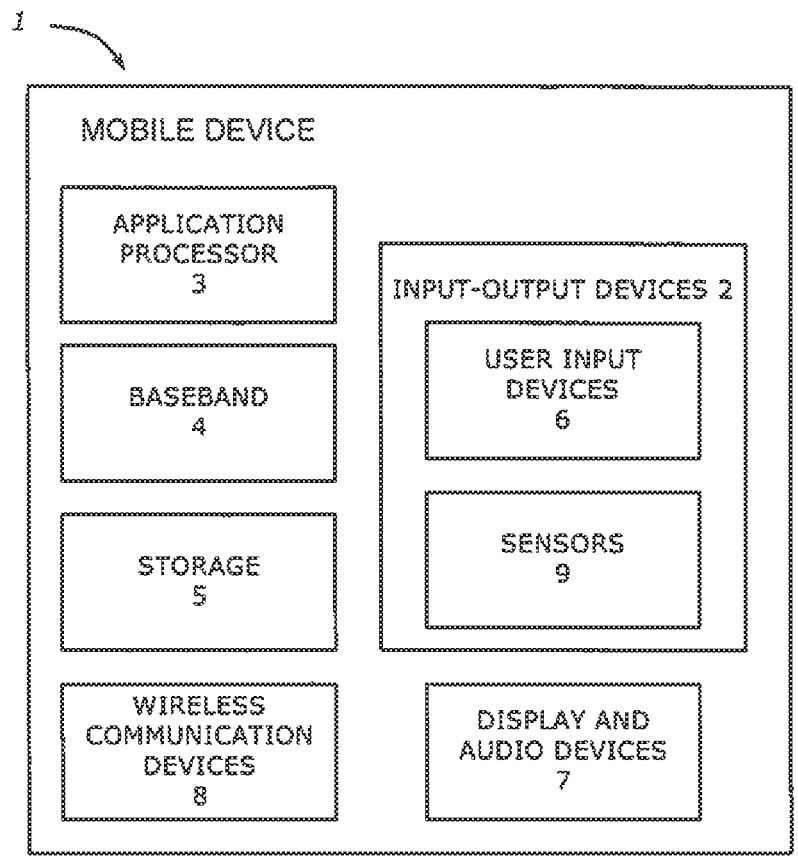
FIG. 4 shows a block diagram of the portable consumer electronic device in which an embodiment of the invention may be implemented

Referring to FIG. 4, a block diagram of the example mobile device in which an embodiment of the invention may be implemented is depicted. However, it is noted that not every embodiment of the invention requires the entire architecture as illustrated in FIG. 4. As shown in FIG. 4, device 1 may include input-output devices 2, processing circuitry including an application processor 3 and a wireless communication processor (baseband) 4, and storage 5.

Input-output devices 2 allow the device 1 to receive data as well as provide data. In one embodiment, input-output devices 2 may include user input-output devices 6, display and audio devices 7, wireless communications devices 8, and sensors 9. Using the user input-output devices 6 such as the touch screen and physical buttons, the user may supply commands to control the operations of the device 1. For instance, in the camera application, a camera icon may be displayed on the touch screen, which may be used to capture the photograph or video. In another example, a slider bar may be displayed on the display screen that allows the user to select the video option or the still photograph option in the camera application. Further, when using a camera application, the display screen may display a camera screen that allows the user to preview the images that captured by the camera module. When the user has not interacted with the mobile device 1 for a period of time, the mobile device 1 may enter a standby mode. During standby mode, the device 1 may be configured to have the application processor consume less battery power. This may be achieved by, for instance, stopping the execution of less crucial applications that are consuming battery power. In order to prevent unauthorized users to access information in the mobile device 1, the mobile device 1 may be locked. When the mobile device 1 is in a locked mode, the mobile device 1 may requires a password and/or biometrics to unlock. While the mobile device 1 is in a locked mode, if the mobile device 1 detects that commands are received via the user input-output device 6, the display panel may display a locked screen. For example, the locked screen may be a screen that requests that the user enter a password and/or biometrics to unlock the device 1. In some embodiments, limited access to certain applications on the device 1 may be provided without entering password or biometrics. For example, the device 1 may allow a user to gain access to the telephone application to make an emergency phone call or to the camera application to capture a photograph and preview that last captured photograph. In some embodiments, the limited access to the camera application may be provided when the processing circuitry determines that the user intends to capture a photograph or a video based on at least one of: the position, orientation, or movement of the mobile device 1 and the proximity of the mobile device 1 to nearby objects.

To make such determinations, the processing circuitry may receive information from the sensors 9 in the device 1 including a position, orientation, or movement (POM) sensor such as a gyroscope or an accelerometer, and a proximity sensor. The POM sensor may detect force, movement or changes in orientation of the mobile device 1. For example, the POM sensor may be able to detect its movement to determine the components of motion. The components of motion may include: forward (roll axis), vertical (yaw axis), side (pitch axis) and acceleration in the x, y, and z directions. The POM sensor provides a sensor signal that represents any one or more such components, to the application processor 3. The proximity sensor may detect the presence of a nearby object to the mobile device 1 and provide a sensor signal to the application processor 3.

Display and audio devices 7 included in the device 1 may contain audio-video interface equipment such as jacks and other connectors for external devices. For example, the device 1 may include a headset jack to receive a headset plug.

Input-output devices 2 may also include wireless communications devices 8 having communications circuitry such as radio frequency (RF) transceiver circuitry, antennas, etc. . . . In one embodiment, the microphone port and the speaker ports may be coupled to the communications circuitry to enable the user to participate in wireless telephone or video calls that allow or support wireless voice communications. A wireless voice call that uses the wireless communications devices 8 may be a voice-only call or a voice-and-video call that has been placed to or received from any one of a variety of different wireless communications networks and in accordance with any one of several different call protocols. These include: a cellular mobile phone network (e.g. a Global System for Mobile communication (GSM) network and a Long Term Evolution (LTE) network), including current 2G, 3G and 4G networks; and an IEEE 802.11 network (WiFi or Wireless Local Area Network, WLAN) which may support wireless voice over internet protocol (VOIP).

As shown in FIG. 4, the processing circuitry includes an application processor 3 and a wireless communication processor (baseband) 4 that are communicatively coupled to each other via internal bus. The baseband 4 may be any kind of wireless processor, such as for example, cellular processor, a Wi-Fi processor, a Bluetooth processor, etc. Application processor 3 may be any kind of general-purpose processor such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The application processor 3 may be used to control the operations of device 1. For example, the processing circuitry may be coupled to the communications circuitry and execute software to control the wireless communications functionality of device 1 (e.g. initiating an outgoing call or answering an incoming call). In some cases, a particular function may be implemented as two or more pieces of software that are being executed by different hardware units of a processor.

In one embodiment, the processing circuitry is also coupled to the storage 5. The storage 5 stores instructions (e.g. software; firmware) which may be executed by the application processor 3 or baseband 4. For example, the application processor 3 and storage 5 are used to run a camera application that allows the user to use the mobile device 1 as a digital camera and capture photographs and videos. In one embodiment, the application processor 3 and the storage 5 are used to run an application that automatically activates the camera application implemented in a mobile device 1 based on signals received from the sensors 9 regarding the position, orientation and movement of the device 1 and the proximity of the device 1 to nearby objects.

The storage 5 may include one or more different types of storage such as hard disk drive storage, nonvolatile memory, and volatile memory such as dynamic random access memory.

Device 1 can communicate via a wired or wireless path with external devices such as accessories, computing equipment, and wireless network (not shown). Accessories may include headphones (e.g. a wireless cellular headset or audio headphones) and the wireless network may include any suitable network equipment such as cellular telephone base stations, cellular towers, wireless data networks, computers associated with wireless networks, etc. . . .

II. Methods of Automatically Activating a Camera Application from Locked Mode

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
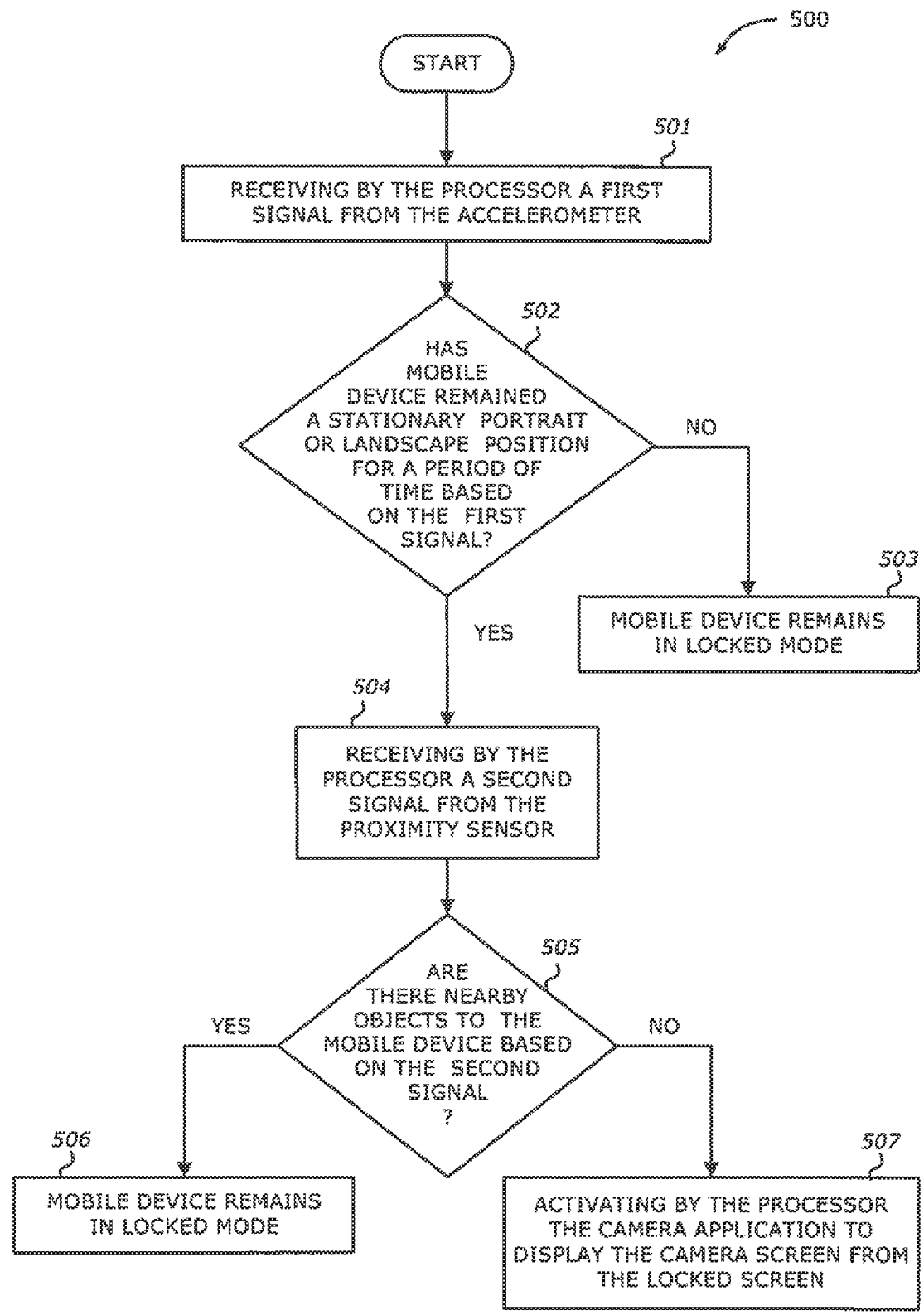
FIG. 5 shows an example method of automatically activating a camera application implemented in a mobile device in locked mode based on detecting a user's intent to capture a photograph or video according to an embodiment of the invention.

FIG. 5 shows an example method of automatically activating a camera application based on detecting a user's intent to capture a photo using a mobile device 1 that is in a locked mode according to an embodiment of the invention. The method 500 in FIG. 5 starts with the application processor 3 receiving a sensor signal from the accelerometer (Block 501). At Block 502, the application processor 3 determines whether the mobile device 1 has remained in a stationary portrait position or a stationary landscape position for a period of time based on the signal from the accelerometer. When the user holds the device 1 in this stationary portrait position or stationary landscape position for a period of time, it may signal an intent to use the camera application. In some embodiments, the period of time may be at least 1 second. The application processor 3 may also account for human error in its determination of the portrait or landscape position since the user may not be holding the mobile device 1 in a perfect portrait or landscape position. More specifically, the user may be holding the mobile device 1 a few degrees forward/backwards (roll axis) or left/right (yaw axis) of the reference axis (i.e., x-axis being parallel to the ground and y-axis being perpendicular to the ground). In some embodiments, in the application processor's determination in Block 502, the application processor 3 may consider that the mobile device 1 is in a stationary portrait or landscape position if the mobile device 1 is ±0.5° to left or right (i.e., roll) and up to ±1° forwards or backwards (i.e., pitch) of the stationary portrait or landscape position. In another embodiment, the period of time may be extended based on the difference of the current position to the reference axis or axes. In some embodiments, the extended period of time may be reduced if the offset position relative to the reference axis or axes is consistently performed.

If the application processor 3 determines that the mobile device 1 did not remain in a stationary portrait or landscape position for a period of time in Block 502, the mobile device 1 will remain in locked mode (Block 503). Accordingly, the mobile device 1 will continue to display the locked screen and will not activate the camera application.

In the embodiment illustrated in FIG. 5, the method 500 consults another sensor signal to determine whether the user intends to capture a picture or video. In this embodiment, if the application processor 3 determines that the mobile device 1 remained in a stationary portrait or landscape position for a period of time in Block 502, the application processor 3 receives a sensor signal from the proximity sensor at Block 504. At Block 505, the application processor 3 determines whether there is the presence of nearby objects to the mobile device 1 based on the received sensor signal from the proximity sensor. The presence of nearby objects to the mobile device 1 may be an indication that the mobile device 1 is merely in the stationary portrait or landscape position in a user's pocket or backpack such that the user does not intend to use the camera application. Referring back to FIG. 5, if the application processor 3 determines that there are objects close to the mobile device 1 in Block 505, the mobile device 1 will remain in locked mode (Block 506). Otherwise, if the application processor 3 determines in Block 502 that there are no nearby objects to the mobile device 1, the application processor 3 activates the camera application in Block 507, which includes a signaling to the display screen to display a camera screen from the locked screen. The display screen that is currently displaying a locked screen will change its display to the camera screen so that the user can preview the photograph or video to be captured. The activation of the camera application in Block 507 provides only limited access to the mobile device 1 by allowing the user to capture a picture or video and previewing this latest captured picture or video. Accordingly, at Block 507, the user is not able to access the collection of pictures that the user has previously captured and stored on this mobile device 1 ("camera roll") or stored in a cloud storage ("photo stream") without entering the required password or biometrics. Further, when the user is provided limited access to the camera application in Block 507, the user may not access the other application or data stored on the mobile device 1. The application may nonetheless, without making such data available to the user, internally access certain data (such as location [e.g. from a Global Positioning System (GPS)] or user identity [e.g. from a contact list or address book stored in the mobile device or in the cloud storage]) as required for operations associated with image or video capture (such as recording photo metadata, including, for instance, location and user identity).

In some embodiments, if the application processor 3 determines that the mobile device 1 remained in a stationary portrait or landscape position for a period of time in Block 502, the application processor 3 will activate the camera application from the locked screen (Block 507) without having to consult the sensor signals received from the proximity sensor.

In another embodiment, some or all of the method illustrated in FIG. 5, may be implemented in hardware. For instance, a hardware state machine that includes hardwired logic may be used to filter the data from the sensor 9 (Blocks 501 and 504) and determine that mobile device 1 remained in a stationary portrait or landscape position for a period of time (Block 502) and/or determine that there are nearby objects to the mobile device 1 (Block 505). Based on its determinations, this hardware state machine may provide a signal to the application processor 3 when the camera application is to be activated and the camera screen is to display the camera screen from the locked screen (Block 507). This embodiment may reduce the amount of power consumed by the application processor 3 by reducing the number of interrupts from sensor 9 to the application processor 3 and/or by allowing the application processor 3 to avoid polling the sensors repeatedly.

In another embodiment, a user may receive an incoming phone call on a mobile device 1 without entering his password or biometrics. However, since the mobile device 1 was in locked mode and locked prior to receiving the incoming call, the user will be prompted to unlock the mobile device 1 if the user wishes to access the applications in the mobile device 1. In this embodiment, while the mobile device 1 is still in an active phone call, in order to activate the camera application without unlocking the phone, the user may hold the phone away from his ear in a stationary portrait or landscape position for a period of time. In this embodiment, the application processor 3 may determine that the mobile device 1 remains in a stationary portrait or landscape position for a period of time based on the signal from the accelerometer and that there are no nearby objects (e.g., the user's face) to the mobile device 1 based on the signal from the proximity sensor and will activate the camera application from the locked screen. However, if the mobile device 1 is being held to the user's ear and is also remains in a stationary portrait or landscape position for a period of time, the application processor 3 will not activate the camera application since there proximity sensor will provide a signal that indicates that a nearby object is detected (e.g., the user's face).

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A mobile device comprising:
    an external housing;
    a set of one or more processors;
    data storage containing an operating system and application software for execution by the set of one or more processors, the application software including a camera application;
    a display screen to display a locked screen requiring user authentication from a user when the mobile device is in a locked mode in order to unlock the mobile device;
    a camera module including a camera lens; and
    a sensor to detect at least one of movement, position or orientation of the mobile device and to send a first signal to the set of one or more processors;
    wherein, when the set of one or more processors determines that the mobile device is in the locked mode and determines the mobile device is in a portrait position based on the first signal, the processor activates the camera module before the user is authenticated and while maintaining the locked mode of the mobile device, and the activated camera module operates to capture an image while the mobile device is in the locked mode and in the portrait position.

2. The mobile device of claim 1 wherein the set of one or more processors activates the camera module based on the first signal and a second signal.

3. The mobile device of claim 2, further comprising:
    an additional sensor to send the second signal to the set of one or more processors.

4. The mobile device of claim 3, wherein, when the set of one or more processors receives the first signal and the second signal, the set of one or more processors determines whether to activate the camera module when the portrait position is a stationary portrait position.

5. The mobile device of claim 2, wherein the second signal indicates the mobile device is in the portrait position.

6. The mobile device of claim 2, wherein the set of one or more processors determines that the mobile device is in the portrait position based on the first signal when the mobile device is in a position that is rolled up to ±0.5° from the portrait position.

7. The mobile device of claim 2, wherein the set of one or more processors determines that the mobile device is in the portrait position based on the first signal when the mobile device is in a position that is pitched up to ±1° from the portrait position.

8. The mobile device of claim 1, wherein the camera module allows the user of the mobile device to capture photographs and videos with the camera module.

9. The mobile device of claim 1, wherein the set of one or more processors is configured to unlock the mobile device in response to receipt of a valid user authentication comprising one of a password or biometric.

10. A method of activating a camera module implemented in a mobile device including a set of one or more processors, a sensor, storage for storing an operating system and a camera application, and a display device, the method comprising:
receiving, by the set of one or more processors, a first signal from the sensor that detects at least one of movement, position or orientation of the mobile device;
activating, by the set of one or more processors, the camera module, while the mobile device is in a locked mode, when the set of one or more processors determines that the mobile device is in a portrait position based on the first signal while in the locked mode,
wherein the set of one or more processors activates the camera module before a user is authenticated and while maintaining the locked mode of the mobile device, and wherein the camera module operates to capture an image while the mobile device is in the locked mode.

11. The method of claim 10 wherein the set of one or more processors activates the camera module based on the first signal and a second signal.

12. The method of claim 11, further comprising:
receiving, by the set of one or more processors, the second signal from an additional sensor included in the mobile device.

13. The method of claim 11, wherein, when the set of one or more processors receives the first signal and the second signal, the set of one or more processors determines whether to activate the camera module.

14. The method of claim 11, wherein the second signal indicates the mobile device is in the portrait position and the portrait position is a stationary portrait position.

15. The method of claim 11, wherein the set of one or more processors determines that the mobile device is in the portrait position based on the first signal when the mobile device is in a position that is up to ±0.5° to left or right of the portrait position.

16. The method of claim 11, wherein the set of one or more processors is configured to unlock the mobile device in response to receipt of a valid user authentication comprising one of a password or a biometric.

17. The method of claim 10, wherein the camera module allows a user of the mobile device to capture photographs and videos with the camera module.

18. A non-transitory computer-readable medium of a storage device having stored thereon instructions, which when executed by a set of one or more processors causes the set of one or more processors to perform a method comprising:
receiving a first signal from a sensor included in a mobile device that detects at least one of movement, position or orientation of the mobile device; and
activating a camera module implemented in the mobile device, while the mobile the mobile device is in a locked mode, when the set of one or more processors determines that the mobile device is in a portrait position based on the first signal while in the locked mode,
wherein the set of one or more processors activates the camera module before a user is authenticated and while maintaining the locked mode of the mobile device, and wherein the camera module operates to capture an image while the mobile device is in the locked mode.

19. The non-transitory computer-readable medium of claim 18, wherein the set of one or more processors activates the camera module based on the first signal and a second signal.

20. The non-transitory computer-readable medium of claim 19, further comprising:
receiving the second signal from an additional sensor included in the mobile device.

21. The non-transitory computer-readable medium of claim 20, wherein the second signal indicates the mobile device is in the portrait position and the portrait position is a stationary portrait position.

22. The non-transitory computer-readable medium of claim 21, wherein the set of one or more processors determines that the mobile device is in the portrait position based on the first signal when the mobile device is in a position that is up to ±0.5° to left or right of the portrait position.

23. The non-transitory computer-readable medium of claim 22, wherein the set of one or more processors is configured to unlock the mobile device in response to receipt of a valid user authentication comprising one of a password or a biometric.

24. The non-transitory computer-readable medium of claim 23, wherein the camera module allows a user of the mobile device to capture photographs and videos with the camera module included in the mobile device.

* * * * *